United States Patent [19]

Higginbotham

[11] 4,417,381
[45] Nov. 29, 1983

[54] METHOD OF MAKING GAS TURBINE ENGINE BLADES

[75] Inventor: Gordon J. S. Higginbotham, Darley Abbey, United Kingdom

[73] Assignee: Rolls-Royce Limited, London, England

[21] Appl. No.: 355,620

[22] Filed: Mar. 8, 1982

[30] Foreign Application Priority Data

Apr. 14, 1981 [GB] United Kingdom ............... 8111778

[51] Int. Cl.³ .............................................. B23P 17/02
[52] U.S. Cl. .................................. 29/156.8 H; 29/423;
29/463; 164/35; 164/516; 228/182; 228/193;
416/233
[58] Field of Search ................... 29/156.8 B, 156.8 H,
29/156.8 T, 423, 463; 228/171, 193; 164/34, 35,
36, 516, 517, 518, 519; 416/233

[56] References Cited

U.S. PATENT DOCUMENTS

| 3,239,897 | 3/1966 | Lirones | 164/34 X |
| 3,241,200 | 3/1966 | Lirones | 164/34 X |
| 3,422,880 | 1/1969 | Brown et al. | 164/34 X |
| 3,596,703 | 8/1971 | Bishop et al. | 29/156.8 H X |
| 3,656,222 | 4/1972 | Jones | 29/156.8 B X |
| 3,981,344 | 9/1976 | Hayes et al. | 164/516 |

Primary Examiner—Charlie T. Moon
Assistant Examiner—Ronald S. Wallace
Attorney, Agent, or Firm—Cushman, Darby & Cushman

[57] ABSTRACT

A method of making a two part aerofoil gas turbine engine blade consisting of casting each individual part separately, the parts being cast by the lost wax process, and subsequently joining the parts together after machining.

4 Claims, 10 Drawing Figures

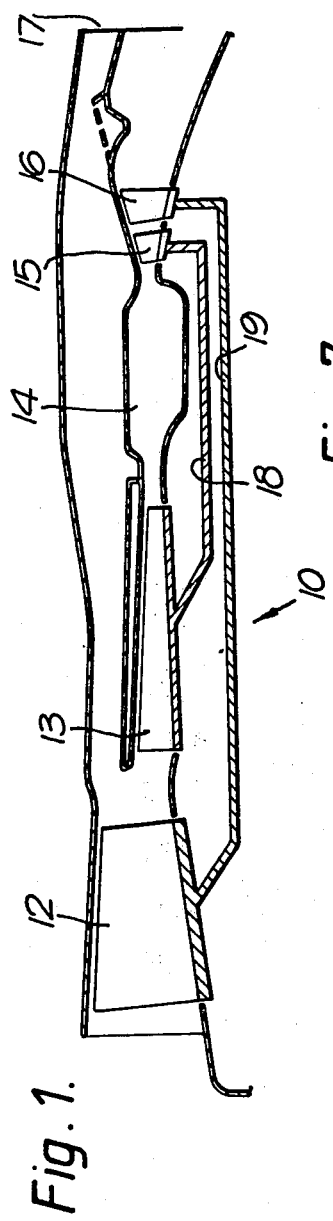
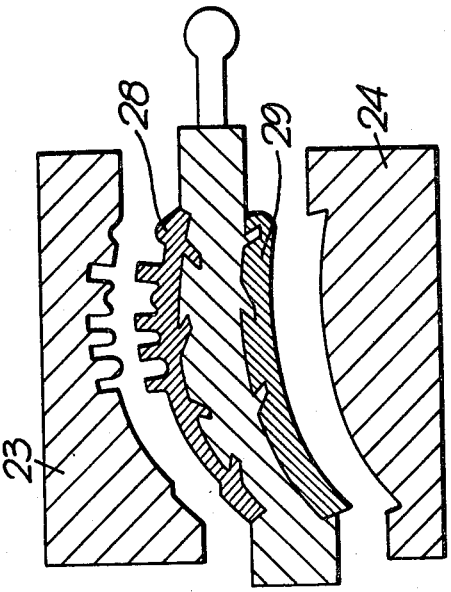
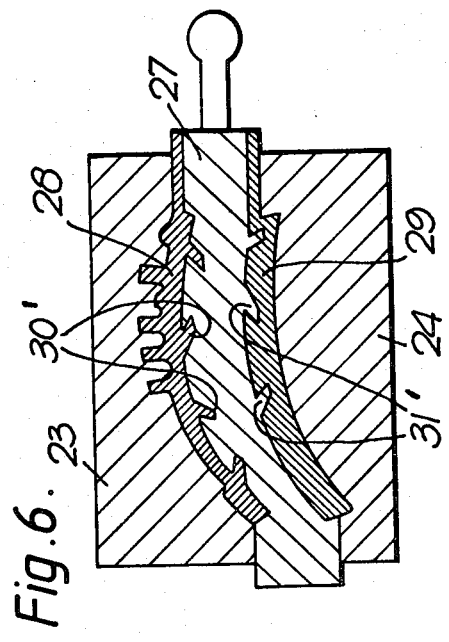

Fig. 2.
Fig. 3.
Fig. 4.
Fig. 5.
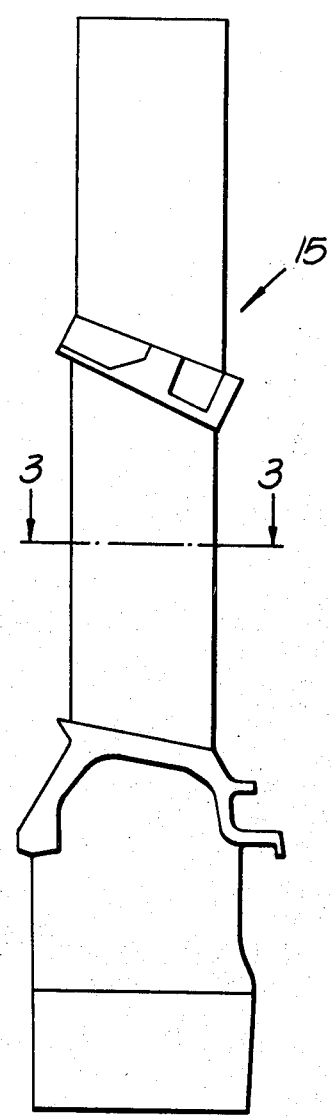
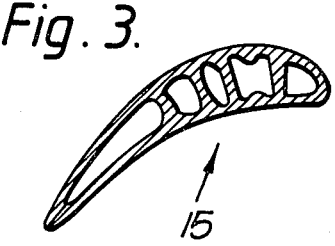
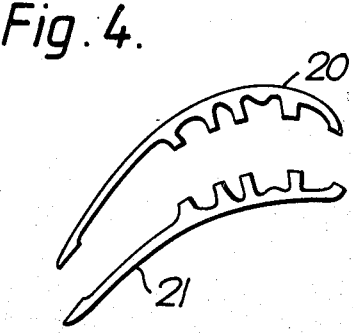
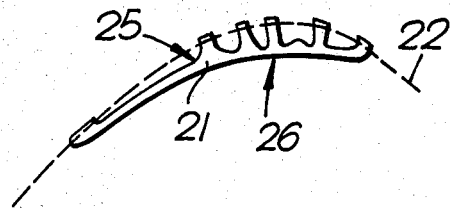

METHOD OF MAKING GAS TURBINE ENGINE BLADES

This invention relates to gas turbine engine blades or vanes including an aerodynamic shaped working section and more particularly to an improved method of manufacturing such blades.

It is well known that during recent years aerofoil shaped gas turbine blades or vanes have become progressively more complex. In particular it has become necessary to provide highly complex cooling passageways within turbine blades, such that they may be used in much higher temperature operating environments than was previously thought possible. The manufacture of such blades has threfore led to the development of new manufacturing techniques or alternatively the use of highly complex cores to produce the necessary complex blade cooling passageways required.

Such cores are both expensive to manufacture and because of their complexity are easily damaged and may quite easily be incorrectly positioned within the mould; these factors all serve to increase the scrap rate of blades. Furthermore such finished blades are extremely difficult or sometimes almost impossible to inspect satisfactorily especially for cross-sectional wall thicknesses etc.

A further method at present used is to make the blades in two halves by the lost wax casting process and subsequently join them together, making use of an axially extended and enlarged chord thickness ceramic core of high precision to form inside features of the blade halves and joint faces. However the present known method suffers disadvantages associated with ceramic cores. The precision required for the joint faces requires exceptional accuracy of the core leading to high cost and unless the core is very nearly perfect, it means that a convex blade half, and concave half from different cores will not fit together correctly, and as a consequence a disproportionately high number of blades are scrapped.

An object of the present invention is to provide a method of manufacturing a blade in which the aforementioned disadvantages are substantially eliminated and which does not necessitate the use of a core.

According to the present invention a method of manufacturing a gas turbine engine blade or vane comprising two halves includes the steps of providing a first female mould the interior mould surface of which defines the internal surface of one blade portion, providing a second female mould the interior mould surface of which defines the external surface of the one blade portion, and providing a common intermediate member interposed between the two mould portions, injecting wax to form patterns within the two mould cavities formed by the first and second mould portions together with the common intermediate member, removing the first and second mould portions from the common intermediate member to leave the wax patterns attached to the common intermediate member, applying a layer or layers of ceramic material to the wax patterns, firing the ceramic such as to rigidify it and remove the wax therefrom, then removing the ceramic portions from the common intermediate member and locating them together to define a casting cavity therebetween, providing a runner system to communicate with the casting cavity and applying a further ceramic layer or layers to the exterior surfaces of the two ceramic portions to secure them together, subsequently firing the assembly and thereafter casting it with liquid metal to form a blade half, and furthermore forming a second blade half portion using a further set of moulds and a common intermediate member and thereafter securing the two completed blade halves together to form a blade.

Preferably the common intermediate members are each provided with either re-entrant or angled holes within their surfaces such that the wax patterns remain attached thereon after removal of the first and second moulds.

Furthermore after casting the two blade halves may be machined on their mating surfaces prior to being secured together.

Preferably the two blade halves are secured together by diffusion bonding.

For better understanding thereof the invention will now be more particularly described by way of example only and with reference to the accompanying drawings in which:

FIG. 1 shows a diagrammatic side view of a portion of a gas turbine engine and includes a diagrammatic view of a turbine blade made in accordance with the present invention.

FIG. 2 shows an enlarged side view of the turbine blade shown diagrammatically at FIG. 1.

FIG. 3 shows a section taken through the turbine blade at line 3—3 on FIG. 2.

FIG. 4 shows the same section taken through the turbine blade as at FIG. 3 however in this case the blade is split into its two halves.

FIG. 5 shows a section of one of the turbine blade halves shown at FIG. 3 in the unmachined condition.

FIGS. 6 and 7 show a cross-sectional view through a mould showing the first stages of manufacture of a wax pattern forming one blade half.

Figure 8:
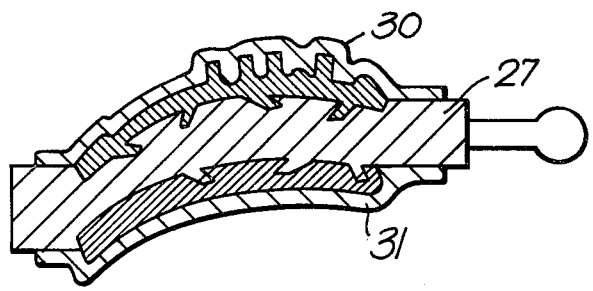
FIG. 8 shows the wax patterns after being coated with a ceramic material.
Figure 9:
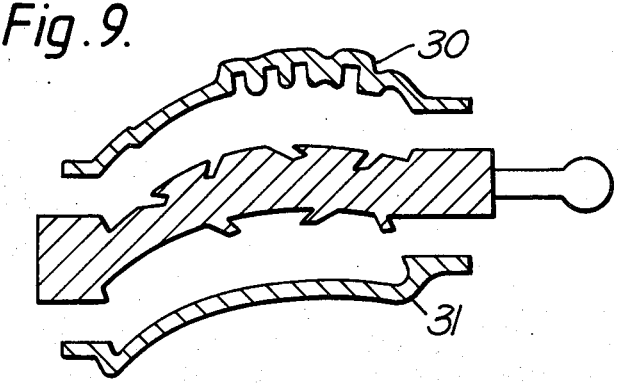
FIG. 9 shows the two completed ceramic mould portions which together form one half of the blade.
Figure 10:
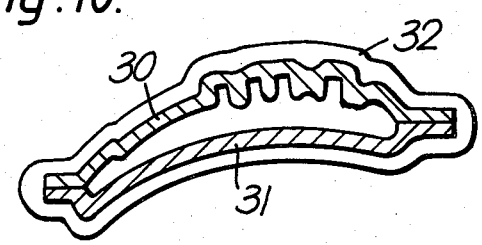
FIG. 10 shows the completed ceramic mould portions located together and encapsulated within a further covering of ceramic material.

Referring to the drawings a gas turbine engine shown generally at 10 comprises a low pressure compressor 12, a high pressure compressor 13, combustion equipment 14, a high pressure turbine 15, a low pressure turbine 16, the engine terminating in an exhaust nozzle 17. The low pressure compressor 12 and turbine 16, and the high pressure compressor 13 and turbine 15 are each mounted upon rotatably mounted engine main shafts shown at 18 and 19 respectively. One complete blade of the high pressure turbine 15 is shown in greater detail including its cooling passageways at FIGS. 2 and 3 whilst FIG. 4 shows a view of the same blade in two halves 20 and 21 prior to being bonded together. FIG. 5 shows a view of the blade half 21 prior to being machined, the blade half being machined down to a size shown by the broken line 22 prior to being assembled together with its other respective blade half. The machining may be done by any conventional machining process or alternatively be eroded away electrically by spark or electrolytic machining. To ensure perfect mating surfaces between the two respective blade halves it may be advantageous to machine the blade halves simultaneously using an abrasive or electrochemical finished process or alternatively by spark machining. Depending upon the degree of accuracy to which the respective blade halves 20 and 21 are cast it may be found sufficient to only finish them and thus dispense with the earlier machining stages.

The blade halves 20 and 21 are cast separately by the well known technique known as "investment casing" or the "lost wax process". It is not proposed to describe this broad method of casting in particular detail as it is a well known casting technique widely used in the manufacture of gas turbine parts and other precision castings.

As can be seen from FIGS. 6 and 7 of the drawings in order to manufacture the blade half 21, first and second mould parts 23 and 24 are provided. The mould part 23 has defined upon its interior moulding surface a shape corresponding to the shape of the internal surface 25 of the blade half 21. Similarly the mould part 24 has defined upon its interior moulding surface a shape corresponding to the shape of the external surface 26 of the blade half 21.

Interposed between the two mould parts 23 and 24 is located a common intermediate member 27 which defines the aperture within which wax patterns corresponding to the finished shape of the blade half 21 is cast. The wax patterns 28 and 29 are subsequently cast within the apertures and to ensure that they remain attached to the common intermediate member 27 after removal of the mould parts 23 and 24 the common intermediate member 27 is provided with either angled, or alternatively re-entrant holes or projections 30' and 31' into or around which the molten wax may flow during casting or wax injection stage.

After solidification of the wax and subsequent removal of the mould parts 23 and 24, the surface of the wax patterns 28 and 29 and adjacent portions of the common intermediate member 27 are coated or stuccoed with ceramic material in the conventional manner well known in the investment casting process to produce two ceramic mould portions 30 and 31.

The ceramic material is thereafter heated and fired in the well known manner such that it is rigidified and the wax removed. The ceramic mould portions 30 and 31 are thereafter removed from the common intermediate member 27 located together and then further coated or stuccoed with ceramic material 32 which is thereafter fired to complete the mould. The blade half 21 may then be cast in the completed mould.

The other blade half portion 20 is manufactured in a similar manner as the blade half 21 using a different set of appropriately shaped mould parts, and the two blade parts may thereafter be machined or finished and then bonded together by diffusion bonding or some other similar metallurgical bonding process.

It will be appreciated that by use of the present invention highly complex blade forms may be cast to close tolerances with the minimum of distortion. Furthermore by use of suitable cores it is possible to provide further holes or passageways actually within the blade wall if so desired. The cores may be simply located within the apertures defined by the mould parts 23 and 24 and the common intermediate member prior to the injection of the wax. Further advantages may also be obtained from the type of blades hereinbefore described if they are cast by the new blade casting techniques which have recently become available such as for example directionally solidified or single crystal type castings.

I claim:

1. A method of manufacturing a gas turbine engine blade or vane comprising two halves includes the steps of providing a first female mould the interior mould surface of which defines the internal surface of one blade half, providing a second female mould, the interior mould surface of which defines the external surface of the one blade half, providing a common intermediate member interposed between the first and second moulds, injecting wax to form patterns within the two mould cavities formed by the first and second moulds together with the common intermediate member, removing the first and second moulds from the common intermediate member to leave the wax patterns attached to the common intermediate member, applying a layer or layers of ceramic material to the wax patterns, firing the ceramic such as to rigidify it and remove the wax therefrom, removing the ceramic portions from the common intermediate member and locating them together to define a casting cavity therebetween, providing a runner system to communicate with the casting cavity and applying a further ceramic layer or layers to the exterior surfaces of the two ceramic portions to secure them together, subsequently firing the assembly and thereafter casting it with liquid metal to form a blade half and furthermore forming a second blade half portion using a further set of moulds and a common, intermediate member by repeating the above steps, and thereafter securing the two completed blade halves together to form a blade.

2. A method as claimed in claim 1 in which the common intermediate members are each provided with either re-entrant or angled holes within their surfaces such that the wax patterns remain attached thereon after removal of the first and second moulds.

3. A method as claimed in claim 1 in which after casting the two blade halves are machined on their mating surfaces prior to being secured together.

4. A method as claimed in claim 1 in which the two blade halves are secured together by diffusion bonding.

* * * * *